United States Patent [19]
Gross et al.

[11] Patent Number: 5,425,907
[45] Date of Patent: Jun. 20, 1995

[54] METHOD OF MAKING A CYLINDRICAL FILTER CARTRIDGE

[75] Inventors: Stephen E. Gross; Jeff K. Woodring, both of Littleton, Colo.

[73] Assignee: Schuller International, Inc., Denver, Colo.

[21] Appl. No.: 138,322

[22] Filed: Oct. 18, 1993

[51] Int. Cl.$^6$ ............................................. B29C 44/12
[52] U.S. Cl. ..................... 264/45.7; 264/46.4; 264/46.9; 264/50; 264/128; 264/138; 264/257; 264/DIG. 48; 156/79
[58] Field of Search ............. 264/DIG. 48, 46.4, 46.6, 264/257, 128, 45.7, 123, 138, 50, 46.9; 156/79

[56] References Cited

U.S. PATENT DOCUMENTS

| | | | |
|---|---|---|---|
| 3,768,118 | 10/1973 | Ruffo et al. | 264/112 |
| 3,772,739 | 11/1973 | Lovgren | 425/82.1 |
| 3,933,557 | 1/1976 | Pall | 156/167 |
| 4,018,646 | 4/1977 | Ruffo et al. | 162/146 |
| 4,112,159 | 9/1978 | Pall | 428/36 |
| 4,594,202 | 6/1986 | Pall et al. | 264/8 |
| 4,619,948 | 10/1986 | Kennedy et al. | 264/46.6 |
| 4,661,132 | 4/1987 | Thornton et al. | 156/167 |
| 4,726,901 | 2/1988 | Pall et al. | 210/496 |
| 4,812,283 | 3/1989 | Farley et al. | 264/122 |
| 4,869,855 | 9/1989 | Twilley et al. | 264/122 |
| 4,894,157 | 1/1990 | Johnson | 264/45.8 |
| 4,895,685 | 1/1990 | Honda et al. | 264/45.5 |
| 4,921,645 | 5/1990 | Insley | 264/128 |

FOREIGN PATENT DOCUMENTS 54-034475  3/1979  Japan.

Primary Examiner—Allan R. Kuhns
Attorney, Agent, or Firm—Cornelius P. Quinn

[57] ABSTRACT

A cylindrical polymer fiber filter cartridge for liquid filtration is formed by applying an acrylic latex binder, diluted with water, to a batt of thermoplastic polymer fibers and winding the batt onto a core to form a hollow fibrous cylinder while applying compression with a compression roll to an outer surface of the fibrous cylinder. After the batt is fully wound onto the core, the cylindrical cartridge is rotated at a speed sufficient to cause the acrylic latex binder to foam in-situ thereby fluidizing the cartridge to allow the polymer fibers in the cartridge to reorient to form a smooth outer surface on the cartridge and to evenly distribute the acrylic binder throughout the cartridge. The binder in the cartridge is then cured to bond the fibers together at their points of intersection and annular grooves are cut in the outer surface of the cartridge to increase the surface area of the filter.

17 Claims, 2 Drawing Sheets

METHOD OF MAKING A CYLINDRICAL FILTER CARTRIDGE

BACKGROUND OF THE INVENTION

The present invention relates to filters for liquid filtration and in particular to fibrous polymer filters for liquid filtration and the method of manufacturing such filters.

Hollow core cylindrical fibrous filter elements made of batts or blankets of randomly oriented, nonwoven, polymeric fibers are particularly useful as depth filters for filtration or clarification of a variety of liquids. The polymeric fibers forming the filter cartridges can be held together and maintained in juxtaposition in the filter cartridge by fiber-to-fiber bonding at the fibers' points of intersection within the batt or by the mechanical entanglement or intertwining of the fibers.

Fiber-to-fiber bonding can be accomplished by two different processes. In the first process, fiber-to-fiber bonding can be accomplished by a direct bonding of the fibers during the formation of the batt. In this process the fibers are collected into the batt while the fibers are still at a temperature where the fibers are soft or tacky. As the randomly oriented fibers criss-cross each other when the fibers are collected to form the blanket, the fibers fuse or stick together at their points of intersection and are directly bonded to each other at their points of intersection once the fibers cool. In the second process, the fibers are collected into a blanket of randomly oriented fibers; a binder is applied to the batt of fibers; and the binder is cured to adhesively bond the fibers together at their points of intersection.

When it is desired to form the batt without the use of bonding, the fibers are thoroughly entangled during formation of the batt. By thoroughly entangling the fibers, the fibers are maintained in place in the batt by virtue of their entanglement. U.S. Pat. Nos. 3,933,557; 4,112,159; 4,594,202; and 4,726,901 are generally directed to this process wherein a batt of fibers is formed directly on a filter core and the fibers are maintained in place substantially solely by fiber entanglement or intertwining. In addition, these patents discuss the bonding of fibers together in the batt by softening the fibers to fuse the fibers together or through the use of a binder.

SUMMARY OF THE INVENTION

The present invention is directed to a hollow cylindrical, polymer fiber, filter cartridge for filtering liquids and the method of forming such a filter cartridge, wherein the fibers of the batt used to form the cartridge are adhesively bonded together at their points of intersection by a binder. The filter cartridge of the present invention is less costly than polymer fiber filter cartridges where the polymer fibers are held in place solely by fiber entanglement. In addition, the filter cartridge of the present invention does not have the problem experienced with filter cartridges where the fibers are bonded together by the fusing of the fibers together at their points of intersection. When fibers are collected into a batt while the fibers are still soft and tacky enough to stick together at their points of intersection, the fibers sometimes become fused together in bundles thereby reducing the filtering effectiveness of the cartridge. Tests have also shown that the cylindrical filter cartridges of the present invention have a longer service life than the more costly cartridges formed from batts using fiber entanglement to hold the fibers in place.

The hollow cylindrical filter cartridges of the present invention are formed from batts of thermoplastic polymer fibers, such as, polycarbonate or polyester fibers or other comparable fibers. The polymer fibers are manufactured by commercially known processes of fiberization and are collected into batts of randomly oriented fibers which are substantially free of fiber-to-fiber bonding. A polymeric emulsion binder, such as an acrylic latex binder, diluted with water, is sprayed onto the filter media formed by the batts as they are conveyed to a wrapping station where the filter media is spirally wrapped about a filter core at a low rate of revolutions per minute. As the filter media is wrapped onto the core to form the cylindrical filter cartridge, compression is applied to the filter media by a compression roll that compresses the filter media between the roll and the core.

After the filter media is fully wrapped onto the core in the low speed wrapping step, the hollow cylindrical filter cartridge formed is rotated at a high speed, while still being subjected to compression by the compression roll, to foam the diluted latex binder in-situ and disperse the binder evenly throughout the filter cartridge. This fluidizes the cartridge and causes the fibers to be reoriented to form a smooth outer surface on the cartridge. Since the foam is actually more than 50% air, the foaming of the diluted latex binder saturates the cylindrical cartridge with the binder to evenly distribute the binder throughout the cartridge without having to fully saturate the cartridge with liquid as would be required without the foaming step.

The positive effects of foam binder saturation verses liquid binder saturation are two fold. First, there is less water to be evaporated during the curing of the binder and this reduces energy costs. Second, the foamed binder is far less subject to the effects of migration to the cartridge surface during curing and remains more evenly distributed throughout the cartridge. As water is removed or evaporated during the drying or curing of the foamed binder, the foam becomes unstable and breaks down leaving the latex binder distributed evenly on the fibers and creating channels for the water vapor to escape from within the cylindrical cartridge. If a similar drying technique were used on filter cartridges totally saturated with a liquid binder, the water evaporation would take place only at the surface of the cartridge and the water-borne binder would migrate to and become concentrated at the surface of the cylindrical cartridge. Without the binder being evenly distributed throughout the cylindrical cartridge, the structural integrity of the cylindrical filter cartridge would be greatly reduced affecting the performance of the filter especially when the pressure drop across the filter increased during service.

After the binder in the cylindrical filter cartridge has been cured, annular grooves are cut in the outer surface of the filter cartridge. The grooves provide additional surface area on the outside surface of the filter cartridge so that more dirt can be retained in the filter before excessive pressure builds up across the filter cartridge. In addition, the grooves permit the liquid being filtered to enter the body of the filter cartridge in a direction parallel to the longitudinal axis of the filter cartridge. Since the permeability of the fibrous structure in the direction parallel to the longitudinal axis of the cartridge is greater (the structure is more open in the longitudinal direction than in the radial direction) the grooves provide the filter cartridge with even greater filtration or dirt holding capacity and a reduced pressure differential across the filter cartridge.

Polymeric fiber, cylindrical filter cartridges formed from physically entangled or intertwined fibers or thermally bonded fibers are not currently amenable to the cutting operation required to form the annular grooves in the outer surface of the cartridge. Accordingly, for polymer fiber filter cartridges, the use of annular grooves cut into the outer surface of the cylindrical filter cartridges is unique to filter cartridges where the fibers are bonded together by a binder. Thus, the hollow cylindrical filter cartridges of the present invention provide unique and beneficial features not present in the prior art polymer fiber filter cartridges.

DETAILED DESCRIPTION OF THE INVENTION

Figure 1:
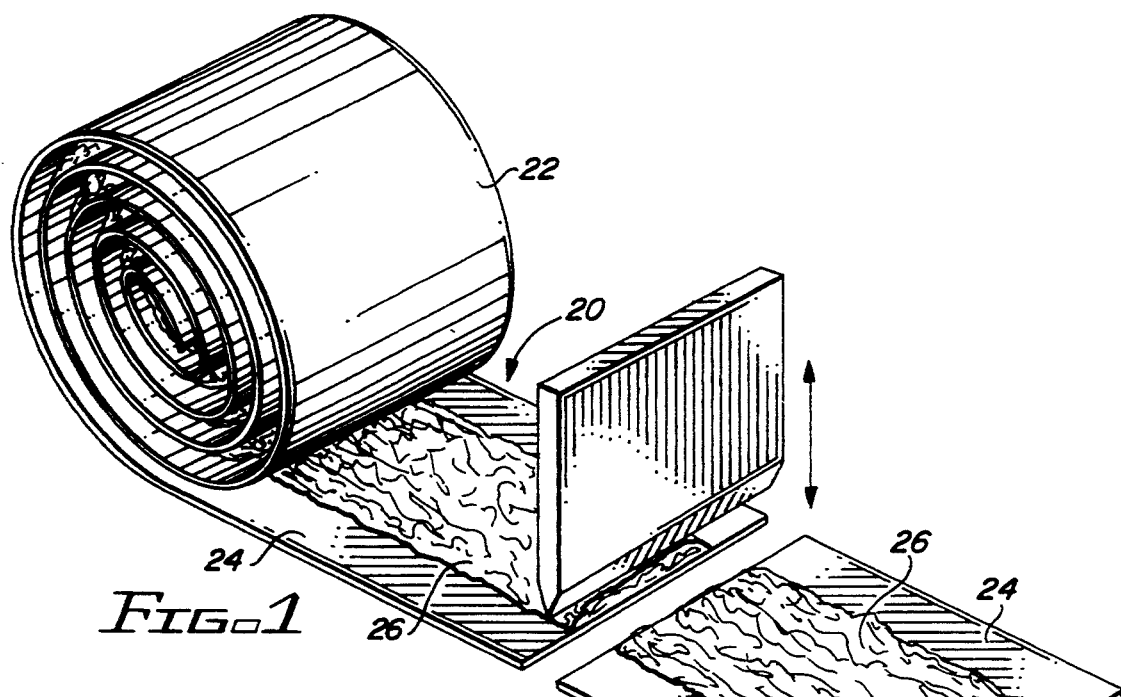
FIG. 1 is a schematic drawing illustrating a batt of randomly oriented polymer fibers being cut to length in preparation for the winding step of the filter forming process.

The method of the subject invention will be better understood by reference to FIGS. 1 to 5 of the drawings. FIG. 1 shows a bulk polymer fiber batt 20 which has been stored in a roll 22. For ease of handling, the rolls are normally about two feet in diameter. In addition, the rolls 22 provide a convenient, relatively low volume method of storing large amounts of bulk fiber media.

The bulk fiber batt 20 can be produced through commercially known fiberizing techniques where the thermoplastic polymer fibers are cooled, so that the fibers are no longer soft or tacky, prior to the collection of the fibers into the batt. Accordingly, the bulk polymer fiber batt 20 is substantially free of direct fiber-to-fiber bonding at their points of intersection within the batt and direct fiber-to-fiber bonding does not provide structural integrity to the batt 20.

The layers of the bulk fiber batt in the roll 22 are separated by a lightweight kraft paper interleaf 24. The kraft paper interleaf 24 protects the fragile fibers and aids in fiber handling in subsequent stages of the process.

The batt 22 is comprised of polymer fibers having average fiber diameters of from about 1 to about 25 microns. The polymer fibers must be dimensionally stable at the temperatures required to cure the binder which is subsequently applied to the batt 20 to bond the fibers together at their points of intersection.

In a preferred embodiment, an acrylic latex binder is used as the polymeric emulsion binder which bonds the fibers together in the fibrous filter media 32 formed from the batt 20. Polycarbonate fibers have been used in batts 20 to produce a filter cartridge for FDA filtration applications e.g., the filtration of potable water, corn syrup, juices, etc. and poly butyl terphthalate (hereinafter "polyester") fibers have been used in batts to produce solvent resistant filter cartridges. Both of these fibers have the dimensional stability required at the curing temperatures of acrylic latex binders. It is contemplated that other polymer fibers, such as, nylon and polypropylene fibers could also be used in the batts that are used to produce the filter cartridges of the present invention. However, low temperature fibers, such as, acrylic and polyethylene fibers would tend to melt or shrink at the temperatures required to cure the acrylic latex binder. The melting or the shrinkage of the fibers would reduce or destroy the porosity of the filter cartridge. Accordingly, low temperature fibers, such as, acrylic or polyethylene fibers can not be used in the preferred filter cartridges 50 of the present invention.

As shown in FIG. 1, the batt 20 is not uniform in thickness across its width. The batt is thickest in the center and has tapered or feathered side edges 26. In preparation for cartridge production, the batt 20 is unrolled from roll 22 and cut into discrete lengths along with the kraft paper interleaf which continues to provide support for the batt of unbonded fibers. The length of each individual batt 28 is normally about two inches longer than the length of the cylindrical filter cartridge to be produced. Thus, the length of each individual batt 28 is thirty-two inches when forming a thirty inch filter cartridge and forty-two inches when forming a forty inch filter cartridge. Rotary knives, chop saws or other conventional cutting means can be used to cut the batt 20 to the lengths desired for the individual batts 28.

Figure 2:
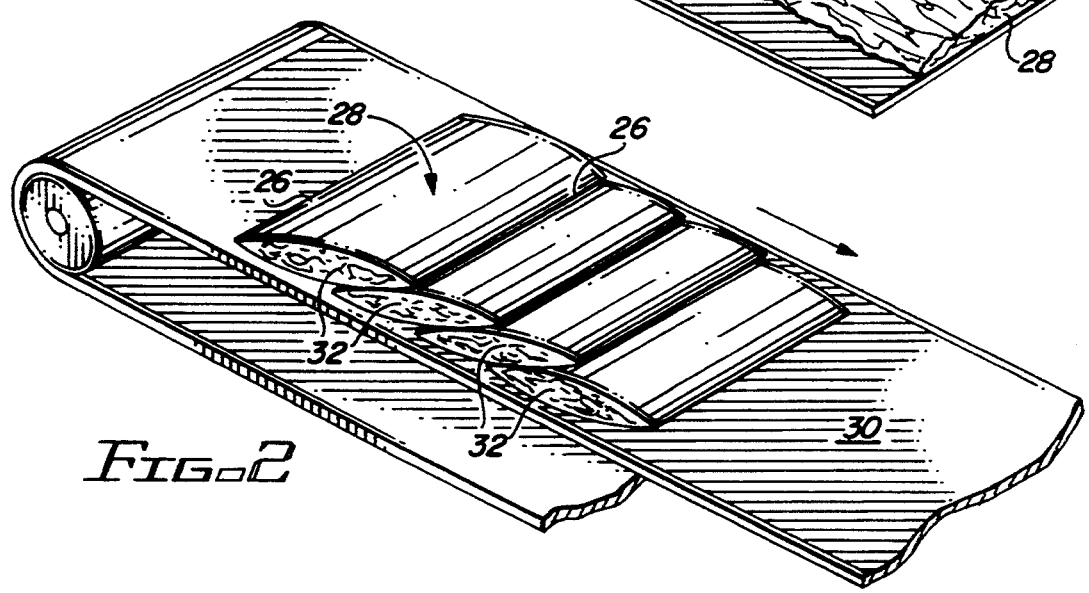
FIG. 2 is a schematic drawing of a series of batts forming the filter media being conveyed to the winding step of the filter forming process.

After the individual batts 28 have been formed, the individual batts 28 are placed on an endless belt conveyor 30 and the kraft paper interleaf 24 is removed from beneath each individual batt 28. To ensure that the cylindrical filter cartridge to be formed from the individual batts 28 will have a uniform density, the individual batts 28 are laid sideways across the endless conveyor belt 30 with the feathered edges 26 of the individual batts 28 in overlapping relationship. FIG. 2 shows four individual batts 28 placed on the conveyor belt 30 in overlapping relationship to form a blanket 32 of filter media, for the winding operation, that is substantially uniform in thickness and density. The number of individual batts 28 placed on the conveyor 30 for the formation of each filter cartridge depends on the thickness and the density of the filter cartridge to be produced.

For certain filter cartridge applications, all of the individual batts 28 placed on the conveyor 30 are formed with thermoplastic polymer fibers having the same average fiber diameter. For other applications (e.g.,fine particle filtration below 25 microns), the lead individual batt 28 of the blanket 32 of filter media is formed of finer diameter fibers than the following individual batts 28 to give the filter cartridge a dual stage depth filtration effect.

Figure 3:
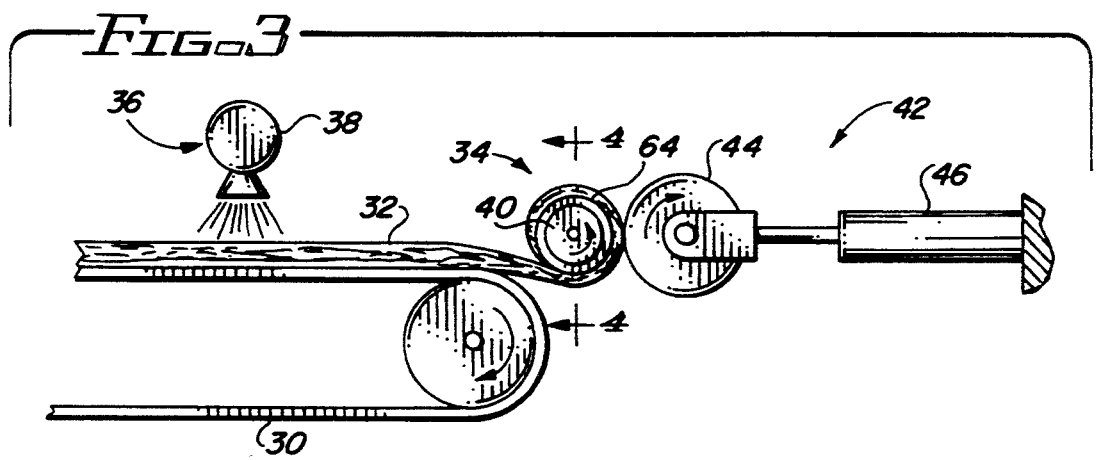
FIG. 3 is a schematic drawing of the fibrous filter media made up of the series of batts having binder applied thereto as the filter media is conveyed to the cartridge winding station and being wound onto a core mounted on a mandrel in the winding station.
Figure 4:
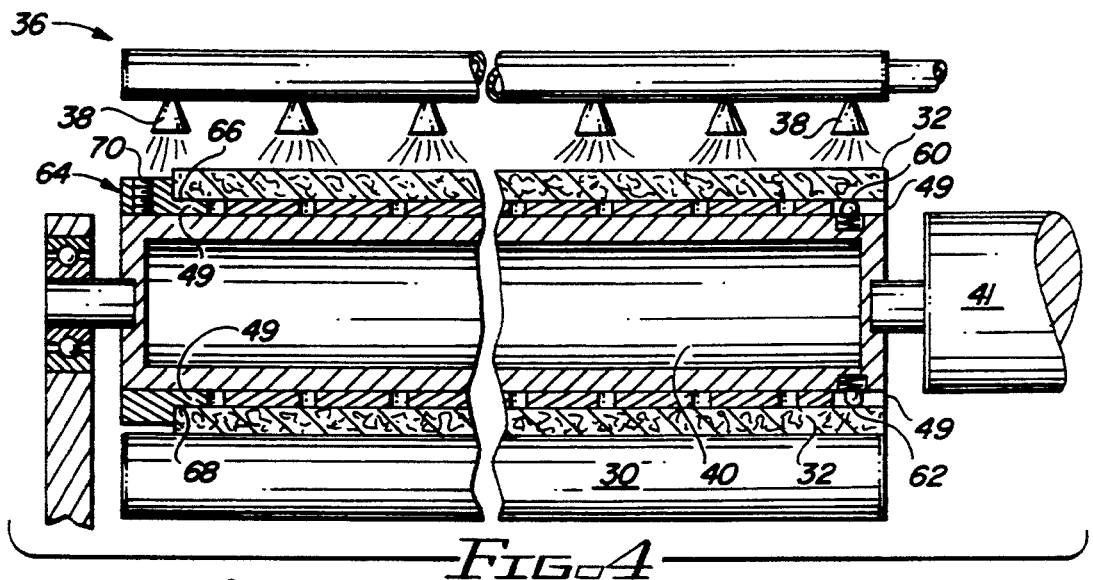
FIG. 4 is a partial sectional view, taken substantially along lines 4—4 of FIG. 3, showing how a filter core can be mounted on the mandrel.

The filter forming blanket 32, comprising a plurality of the individual batts 28, is fed toward a winding station 34 by the conveyor belt 30 which is driven by a conventional variable speed motor. As the filter cartridge forming blanket 32 is fed toward the winding station 34, an acrylic binder, diluted with water, is sprayed onto the blanket 32 at a binder application station 36. As shown in FIGS. 3 and 4, the binder spray station comprises a plurality of individual spray nozzles 38 aligned across the width of the conveyor belt 30. Thus, the diluted binder is applied across the entire width of the filter media blanket 32.

The winding station 34 comprises a rotating, cylindrical, mandrel 40, and a compression roll assembly 42. The rotating mandrel 40 is preferably made of aluminum or stainless steel and, as shown in FIG. 4 the mandrel 40 is driven by a conventional variable speed motor 41. The compression roll assembly 42 comprises a rotating compression roll 44 mounted on a pair of air cylinders 46. In operation, the compression roll 44 is in contact with and driven by the surface of the rotating cylindrical filter cartridge being formed on the mandrel 40.

Figure 6:
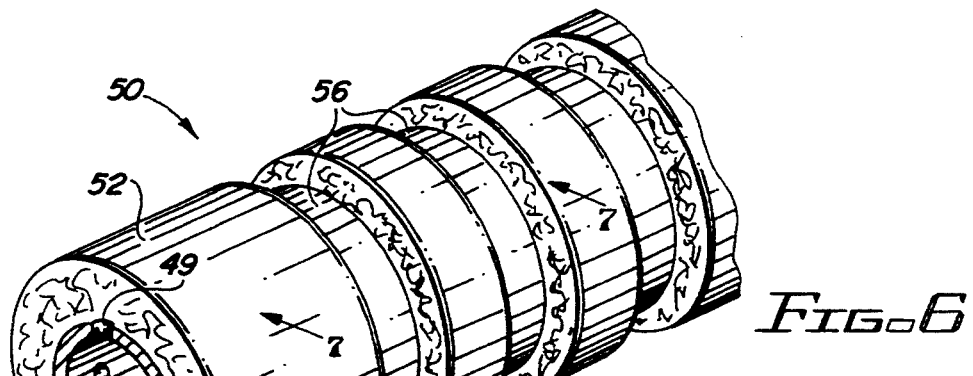
FIG. 6 is a perspective view of a hollow, cylindrical filter cartridge of the present invention.

A tubular, foraminous, filter cartridge core 48 made of polypropylene or some other acceptable material is locked in place on the mandrel 40 during the winding, foaming, curing, grooving and surfacing steps of the process. As shown in FIGS. 4 and 6, the filter cartridge core 48 has a pair of notches 49 at each end. The mandrel 40 is provided with spring loaded locating pins 60 and 62 at one end which are received in the notches 49 at one end of the core 48 and a removable collar 64 at the other end. The collar 64 has a pair of teeth or projections 66 and 68 that are received in the notches 49 at the opposite end of the core 48. The collar is secured to the mandrel 40 by a set screw 70. Thus, as the mandrel 40 is rotated, the filter cartridge core 48 is locked in place on the mandrel and rotates with the mandrel.

As the filter media blanket 32 is fed into the winding station 34, the upper surface of the blanket, with the recently applied tacky binder thereon, sticks to and is picked up by the filter cartridge core 48. Thus, the filter media blanket 32 is wrapped onto the filter cartridge core 48 which is rotated at a rate to have substantially the same surface speed as the filter media blanket being fed into the winding station 34. When the filter media blanket 32 has been wrapped about one quarter of the way around the filter core, the outer surface of the filter media blanket 32 comes in contact with the compression roll 44 which compresses the filter media blanket between the compression roll 44 and the filter core 48. The surface of the compression roll 44 is coated with teflon or some other material to keep the filter media blanket 32 from sticking to the compression roll.

The filter media blanket 32 is spirally wrapped about the filter core 48 on the mandrel 40 at a low rate of revolutions per minute (e.g. about 1 to about 50 rpm) until the blanket 32 is fully wrapped onto the core. While the filter media blanket 32 is being wrapped about the filter core 48, the blanket 32 continues to be compressed between the compression roll 44 and the filter core 48. The spacing between the compression roll 44 and the filter core 48 at the initiation of a winding cycle is less than an ⅛ of an inch to assure that the blanket 32, which is greater than ⅛ of an inch in thickness, is compressed between the compression roll and the filter core. As the filter media wrap builds in thickness, the air cylinders 46 automatically increase the spacing between the compression roll 44 and the filter core 48 to maintain the filter media under compression while avoiding subjecting the filter media to excessive compression whereby the fragile fibers of the filter media would be broken or filter permeability would be significantly reduced. As the filter media wrap builds in thickness, the surface speed of the filter media in contact with the compression roll 44 increases. Accordingly, the rate of rotation of the compression roll 44 and thereby the surface speed of the surface of the compression roll 44 is also increased to maintain the surface speed of the filter media blanket surface in contact with the compression roll and the surface speed of the compression roll at substantially the same speed. This keeps the filter media blanket from being subjected to shearing forces which could tear or otherwise damage the filter media blanket 32. In addition the feed rate of the conveyor 30 is synchronized with the surface speed of the compression roll so that, as the diameter of the cylindrical filter cartridge 50 being formed increases and the filter media blanket 32 is wrapped faster, the conveyor feed rate automatically increases. This too keeps the filter media blanket 32 from being subjected to undesirable stresses which could tear or otherwise damage the filter media blanket. Conventional commercially available control systems are used to regulate the spacing between the filter core 48 and the compression roll 44 and the speeds of the mandrel 40, the compression roll 44 and the conveyor belt 30.

After the filter media blanket 32 has been fully wound onto the filter core 48, the low speed (e.g., 1 to 50 revolutions per minute) wrapping operation is followed by a high speed spinning operation. During the high speed spinning operation, the compression roll 44 maintains the filter media blanket 32 in compression between the compression roll and the filter core. The speed of rotation of the spinning operation is sufficient to cause the water diluted acrylic latex binder in the filter media blanket 32, under the compressive forces of the compression roll 44, to foam in-situ. A speed of rotation of the mandrel 40 as low as 300 rpm has been found to be sufficient to cause the water diluted acrylic latex binder to foam under the influence of the compressive forces of the compression roll 44. However, at this rate of rotation, the binder does not foam very quickly and it is preferred to rotate the mandrel at about 800 rpm to effect a rapid foaming of the binder. As the speed of rotation of the mandrel 40 is increased to 800 rpm, the speed of rotation of the compression roll 44 is also proportionally increased to maintain the surface speed of the outer surface of the cylindrical filter cartridge and the surface speed of the compression roll at substantially the same speed. This eliminates tearing or other damage to the outer surface of the cylindrical filter cartridge 50 which would be experienced if the surface speeds of the filter cartridge and the compression roll differed.

With the increase in speed of the cylindrical filter cartridge 50 to above 300 rpm and preferably about 800 rpm and with the compression of the filter media by the compression roll 44, the acrylic latex binder foams in place. The foam, which has the consistency of shaving cream, fluidizes the cylindrical filter cartridge 50 and causes the fibers in the filter media 32 to be reoriented during the high speed spinning operation to form a smooth, uniform outer surface on the cylindrical filter cartridge 50. The generation of the foamed binder evenly distributes the binder throughout the cylindrical filter cartridge and saturates the cylindrical filter cartridge with binder without having to saturate the cylindrical filter cartridge with a liquid binder as in previous non-foaming filter forming operations.

Since the foam is more than 50% air, the amount of water in the cylindrical filter cartridge 50 at this stage of the manufacturing operation is much less than in prior art manufacturing processes. The benefits of saturating the filter cartridge with foam as opposed to liquid are two fold. First, there is less water present which has to be evaporated during the curing of the binder. This reduces energy costs associated with the curing operation. Second, the foamed binder is far less subject to the effects of migration to the filter cartridge surface 52 than a liquid binder when the binder is cured and the cartridge is dried. As water is removed from the diluted acrylic latex binder during curing, the foam becomes unstable and breaks down leaving the binder evenly distributed on the fibers of the filter media 32. In addition, as the foam breaks down it creates channels for the water vapor to escape from the inside of the cartridge structure. If a similar drying or curing technique was used on cartridges totally saturated with a liquid binder, the water evaporation would take place only on the surface of the filter cartridge and the water-borne binder would migrate to and become concentrated at the surface of the filter cartridge.

After the cylindrical filter cartridge has been formed on the core 48 in the winding station and the binder has been foamed to disperse it throughout the cylindrical filter cartridge, the filter cartridge 50 and the mandrel 40 are removed from the winding station. The filter cartridge 50 is then batch dried and cured in a forced air oven for about 4 to 10 hours to fully cure the acrylic latex binder. The oven temperatures are appropriately ramped upward from ambient temperatures for each grade of filter cartridge to allow the foamed binder to become unstable, dry and cure with a minimal amount of binder migration. The time required to bring each grade of filter cartridge up to its maximum curing temperature and the time required for the curing of each grade of filter cartridge is determined by trial and error. For the polycarbonate fiber FDA cartridges, the cartridges are cured at a maximum temperature of about 250 degrees Fahrenheit. For the polyester fiber cartridges, the cartridges are cured at a maximum temperature of about 270 degrees Fahrenheit.

Figure 5:
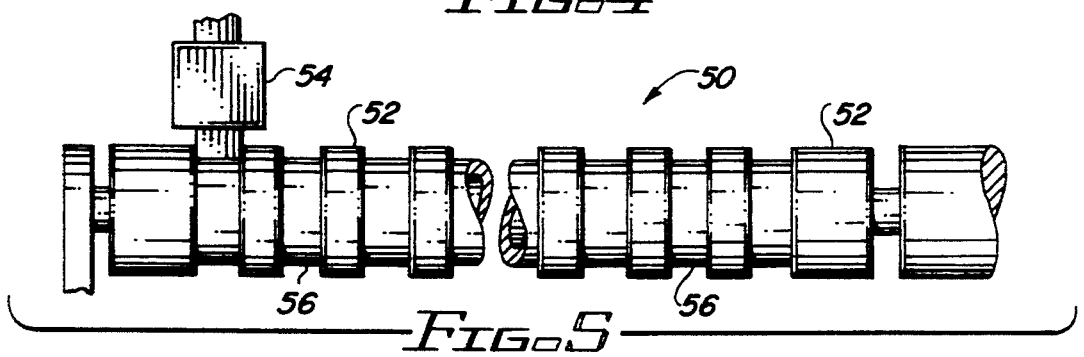
FIG. 5 is a schematic drawing the cutting station of the process where grooves are cut into the outer surface of the cylindrical filter cartridge.

The dried and cured cylindrical filter cartridges 50 are then milled to an outside diameter of 2.6–2.7 inches using a surfacing machine 54, such as the lathe of FIG. 5. This improves the outer surface finish of the filter cartridge and provides the finished cylindrical filter cartridge 50 with the specific outside diameter tolerances required for the product.

Figure 7:
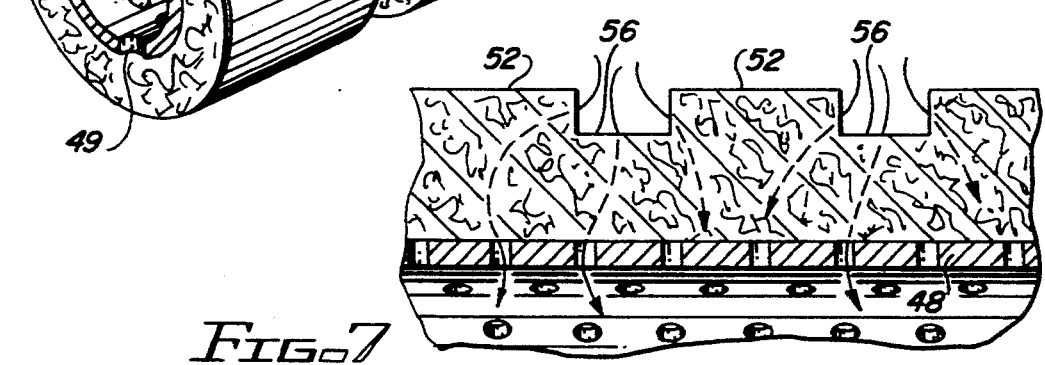
FIG. 7 is an enlarged detailed view of a portion of the filter cartridge of FIG. 6, taken substantially along lines 7—7 of FIG. 6, showing the flow of the liquid being filtered through the filter cartridge.

Following the surface finishing, the lathe machine 54 is used to cut circular or annular grooves 56 in the outer surface 52 of the filter cartridge 50. The grooves 56 are approximately ⅛ of an inch in width and ¼ of an inch in depth. The grooves 56 perform two functions. First, the grooves 56 provide additional surface area on the outside of the filter cartridge 50 so that more dirt can be filtered before excessive pressure build-up occurs across the filter cartridge. Second, as shown in FIG. 7, the grooves 56 allow the liquid being filtered to enter the body of the filter cartridge in a direction parallel to the axis of the filter cartridge. The permeability of the fibrous filter media in the direction parallel to the central longitudinal axis of the filter cartridge 50 is greater than in the radial direction. Since the fibrous filter media 32 is more open in this direction, the filter provides even greater dirt holding capacity and reduced pressure differentials across the filter cartridge 50.

After the grooves 56 have been cut into the outside surface 52 of the filter cartridge, the filter cartridge is ready for finishing. This is accomplished by cutting the cartridge which may be thirty-two or forty-two inches or some other predetermined length into the lengths required by conventional filter housings. These lengths include lengths of 9.75, 10, 19.5, 20, 29.25, 30, 39 and 40 inches long. The cut filter cartridges are vacuumed to remove dust from the cutting operation, packaged in poly bags and labeled.

The filter cartridges 50 made by the process of the present invention are unique in that they are capable of longer filtration service life at given filter efficiencies. This is believed to be the result of having a grooved exterior surface on the filter cartridge and because of the lofty bulk fiber of the filter media. The bulk is maintained in the filter media by the use of the binder to hold the fibers in place which retains the high permeability characteristics of the bulk fiber batts 28 that form the filter media blanket 32 in the finished filter cartridges.

A polycarbonate fiber filter cartridge made in accordance with the present invention using an acrylic latex binder was tested in comparison with a polypropylene fiber filter cartridge of the prior art having unbonded, entangled or intertwined fibers. The test fluid was water; the contaminant was SAE coarse; the contaminant concentration was 1.0 g/gal.; the flow set was 3.0 gpm; and the pressure drop across the filter cartridge to end the test was 30 psi. The base turbidity of the filter cartridge of the present invention was 44.4 FTU and the base turbidity of the prior art filter cartridge was 52.9 FTU.

The results of the test were:

|  | PRESENT INVENTION FILTER | PRIOR ART FILTER |
| --- | --- | --- |
| Initial Turbidity | 9.2 FTU | 7.7 FTU |
| Initial Turbidity Measured at | 5 min. | 5 min. |
| Initial Efficiency | 79% | 85% |
| Filter Life | 28.9 min. | 8.8 min. |
| Avg. Efficiency | 92% | 86% |
| Avg. Turbidity | 3 FTU | 8 FTU |
| Dirt Holding Capacity | 78.0 g. | 22.2 g. |

The filter cartridge of the present invention not only had a higher average efficiency, it had a much longer service life and a much greater dirt holding capacity when compared to the prior art filter cartridge. Thus, the method of the present invention produces a highly effective filter cartridge with a relatively long service life.

What we claim is:

1. A method of manufacturing a cylindrical fibrous filter cartridge comprising:
   providing a batt of fibrous material;
   applying a polymer emulsion binder to the batt of fibrous material;
   providing a foraminous, tubular core;
   wrapping the batt of fibrous material onto the foraminous, tubular core to form a fibrous cylindrical cartridge with a hollow core defined by the foraminous tubular core;
   rotating the fibrous cylindrical cartridge at a speed sufficient to cause the polymer emulsion binder to foam in-situ and become distributed throughout the fibrous cylindrical cartridge; and curing the polymer emulsion binder to bond fibers of the fibrous material together at their points of intersection.

2. The method of claim 1 wherein:

a compression roll contacts an outer surface of the batt of fibrous material to compress the batt between the compression roll and the foraminous, tubular core as the batt of fibrous material is being wound on the foraminous, tubular core and while the fibrous cylindrical cartridge formed is being rotated to foam the polymer emulsion binder in-situ.

3. The method of claim 2 wherein:

the speed of rotation of the fibrous cylindrical cartridge to foam the polymer emulsion binder in-situ is sufficient to fluidize the fibrous cylindrical cartridge and reorient the fibers in the fibrous cylindrical cartridge to form a smooth cylindrical outer surface on the fibrous cylindrical cartridge.

4. The method of claim 1 wherein:

the fibrous material comprises thermoplastic polymeric fibers.

5. The method of claim 4 wherein:

the polymer emulsion binder is an acrylic latex binder diluted with water.

6. The method of claim 5 wherein:

the thermoplastic polymeric fibers are polycarbonate fibers.

7. The method of claim 5 wherein:

the thermoplastic polymeric fibers are polyester fibers.

8. The method of claim 4 wherein:

the binder is cured at temperatures of at least about 250 degrees Fahrenheit and the thermoplastic polymeric fibers are dimensionally stable at temperatures of about 250 degrees Fahrenheit.

9. The method of claim 4 wherein:

annular grooves are cut into the cylindrical outer surface of the fibrous cylindrical cartridge.

10. The method of claim 1 wherein:

the fibrous material is wrapped onto the core such that fibers of the fibrous material adjacent the core of the cylindrical cartridge are finer in average fiber diameter than fibers of the fibrous material adjacent a radially outer surface of the cylindrical cartridge.

11. The method of claim 1 wherein:

the batt of fibrous material is wrapped onto the tubular core at a speed of up to 50 revolutions per minute and the binder is foamed in-situ by rotating the fibrous cylindrical cartridge at about 800 revolutions per minute.

12. A method of manufacturing a cylindrical fibrous filter cartridge for liquid filtration comprising:

providing a batt of thermoplastic polymer fibers substantially free of fiber to fiber bonding;

applying an acrylic latex binder diluted with water to the batt;

wrapping the batt onto a foraminous, tubular core while compressing the batt between the core and a compression roll to form a hollow fibrous cylindrical cartridge;

after the batt is wrapped onto the core, rotating the cylindrical cartridge, while the batt is still being compressed between the compression roll and the core, at a speed sufficient to foam the diluted latex binder in-situ to distribute the binder throughout the cylindrical cartridge and fluidize the cylindrical cartridge to cause the fibers in the batt to reorient to form a smoother outer surface on the cylindrical cartridge; and curing the binder at a temperature of at least about 250 degrees Fahrenheit to bond the fibers together at their points of intersection.

13. The method of claim 12 wherein:

the thermoplastic polymeric fibers are dimensionally stable at temperatures of about 250 degrees Fahrenheit.

14. The method of claim 13 wherein:

annular grooves are cut into the outer cylindrical surface of the cylindrical cartridge.

15. The method of claim 14 wherein:

the thermoplastic polymeric fibers are polycarbonate fibers.

16. The method of claim 14 wherein:

the thermoplastic polymeric fibers are polyester fibers.

17. The method of claim 12:

wherein the cylindrical cartridge is rotated at a speed of at least 300 revolutions per minute to foam the diluted latex binder in-situ.

* * * * *